United States Patent [19]
Bluestone

[11] 3,920,271
[45] Nov. 18, 1975

[54] ELBOW CONNECTOR AND METHOD OF FORMING IT

[75] Inventor: Leonard L. Bluestone, Beachwood, Ohio

[73] Assignee: L. B. Manufacturing Company, Cleveland, Ohio

[22] Filed: July 27, 1973

[21] Appl. No.: 383,153

[52] U.S. Cl............ 285/176; 113/116 UT; 285/183
[51] Int. Cl.² ......................................... F16L 43/00
[58] Field of Search ........... 285/183, 424, 178, 177, 285/179, 176, 226; 113/116 UT

[56] References Cited
UNITED STATES PATENTS

| | | | |
|---|---|---|---|
| 186,125 | 1/1877 | Graham | 285/177 |
| 455,910 | 7/1891 | Gordon | 285/183 |
| 500,119 | 6/1893 | Dieckmann | 285/183 |
| 540,584 | 6/1895 | Dieckmann | 285/183 X |
| 1,901,897 | 3/1933 | Clayton | 285/176 |
| 2,509,782 | 5/1950 | Person | 285/183 |
| 3,076,669 | 2/1963 | Schlein | 285/179 |
| 3,290,066 | 12/1966 | Primich et al. | 285/183 |

*Primary Examiner*—Thomas F. Callaghan
*Attorney, Agent, or Firm*—Watts, Hoffman, Fisher & Heinke Co.

[57] ABSTRACT

A sheet metal elbow connector for connecting two sheet metal pipes. A generally rectangular sheet of metal is formed into a tubular conduit open at both ends and having an intermediate region of oval cross-sectional configuration. Wall portions within the intermediate region are crimped at closely spaced intervals to provide a short radius of curvature bend. In the preferred arrangement, one end region of the conduit forms a transition to an opening of circular cross-sectional configuration and the other end region forms a transition to an opening of oval cross-sectional configuration. The connector end openings are of equal cross-sectional areas.

A method of forming sheet metal elbow connectors. A length of tubular conduit is formed from a piece of sheet metal. Wall portions intermediate the ends of the conduit are crimped at spaced intervals therealong to provide a short radius of curvature elbow bend in an intermediate region having a substantially oval cross-sectional configuration. The end regions of the connector are shaped as required to form a smooth transition to the cross sections of the pipes with which the connector is to mate. At least one of the mating pipe cross sections differs from the oval cross section of the intermediate region.

8 Claims, 10 Drawing Figures

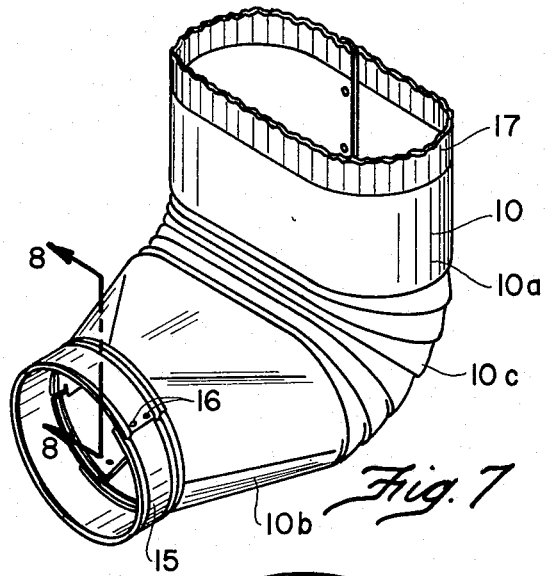
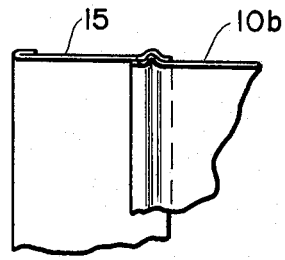
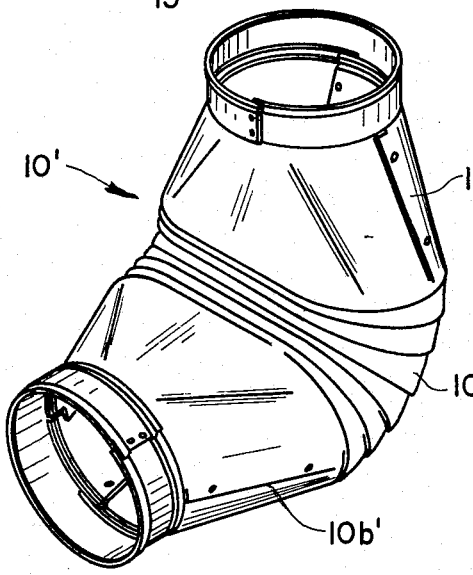
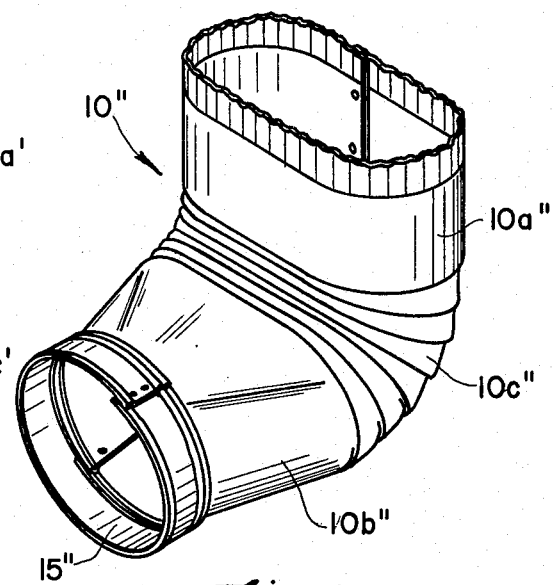

ELBOW CONNECTOR AND METHOD OF FORMING IT

BACKGROUND OF THE INVENTION

1. Field of the Invention

The present invention relates to novel and improved elbow connectors and a method of forming such connectors from sheet metal.

2. Prior Art

In many forced air ducting installations there are needs for transitional elbow connectors which will perform one or more of the following functions:

1. Connect pipes of different cross-sectional configurations having equal perimeters;
2. Connect pipes of different cross-sectional configurations having equal cross-sectional areas;
3. Connect pipes with a minimal radius of curvature bend to permit the elbow to be used in close quarter areas.

An example of the need for one such transitional elbow connector is frequently encountered in residential installations where round and oval ducts are used beneath and in walls, respectively. Round ducts provide the largest possible ducting area that can be formed from a duct material of a given perimeter. Accordingly, round ducts are ordinarily used wherever space permits because they maximize the efficiency of a heating system by minimizing duct area and attendant heat loss. Round ducts also require a minimum of material and are easily handled and fitted during installation.

Oval heating ducts are ordinarily used in places too narrow to accomodate a round duct of sufficient size. Oval ducts have two substantially flat parallel sides connected by two half-round sides, and are the most efficient duct configuration that can be used in walls. The parallel sides are typically spaced apart as far as the wall space will permit, and the half-round sides maximize the duct cross-sectional area while minimizing the duct perimeter.

A number of problems arise where a connection is to be made between round and oval ducts extending at right angles to each other. The need for such a connection is typically encountered where a round duct running horizontally between or below floor joists is to be connected to an oval duct extending upwardly between wall studs. One problem is that the connection frequently needs to incorporate a short radius bend in order to fit in place around the existing framing structure.

Another problem is that the connector frequently needs to provide a transition between an oval duct which is larger in perimeter than the round duct to which it connects. A number of building codes require that ducting have substantially the same cross-sectional area along its length. Since an oval duct encompasses a lesser cross-sectional area than does a round duct of the same perimeter, a larger oval duct must be used to connect with a round duct if ducting area is to be kept constant.

Known transitional elbow connectors have comprised tortuously formed multi-part assemblies which are bulky to ship, inconvenient to install and which cannot be used in closely confined quarters or in installations where a short radius of curvature bend is required. The only known round-to-oval elbow connector is a multi-piece boot formed at considerable expense and requiring a relatively large radius of curvature bend.

The most commonly accepted practice for forming a juncture between right angle pipes in close quarter installations is to design and build a connector tailored to the specific pipe cross sections and the available space in which the connector can be positioned. Such specially designed connectors are often field fit and riveted, substantially lengthening the duct installation time.

SUMMARY OF THE INVENTION

The present invention overcomes the foregoing and other drawbacks of the prior art and provides an extremely simple elbow connector and method of forming it.

Transitional elbow connectors formed in accordance with the present invention feature an extremely simple design and a short radius of curvature elbow bend. The design is readily adapted to form a wide variety of transitional connectors for connecting ducts of different shapes, cross-sectional areas, and perimeters, as the particular installation may require.

One feature of transitional connectors formed in accordance with the present invention is that the bulk of the connector is formed from a single sheet of metal. Preferably a rectangular sheet of metal of about 30 gauge thickness is formed into a tubular conduit open at both ends. The conduit has a first end region adjacent one end, a second end region adjacent the other end, and an intermediate region between the two end regions. The intermediate region is of generally oval cross section and has wall portions which are crimped transversely of the conduit at closely spaced intervals to provide a short radius of curvature elbow bend. The end regions of the connector provide the needed transition between the oval cross section of the intermediate region and the cross sections of the pipes with which the connector is to mate.

Oval-to-round elbow connectors formed in accordance with the present invention comprise a simple assembly formed from a single sheet of material to which a collar is secured to complete the round end region of the connector. The elbow bend is preferably machine formed by crimping intermediate sheet regions at spaced intervals therealong and features a short radius of curvature bend. The collar is preferably machine secured to the sheet by a double shoulder lock formation.

In the preferred embodiment, one end region of the connector has an oval shape which corresponds to that of the oval pipe which it is to connect. The other end region provides a transition from the oval cross section of the intermediate region to the round cross section of the round pipe which it is to connect. If the perimeter of the round pipe is less than that of the oval pipe, as is the situation where the round and oval pipes have equal cross-sectional areas, the end region forming the oval-to-round transition is notched and riveted to effect the transition in a smooth, aesthetically satisfactory fashion.

The connector is preferably formed beginning with a rectangular sheet of metal which is rolled to produce a length of straight tubular conduit having a perimeter which corresponds to that of the oval pipe the connector is to fit. The sheet can be initially rolled to form a conduit of oval or round cross section.

Once the sheet has been rolled to form a conduit, adjacent side regions of the sheet are secured together to provide a seam extending longitudinally of the conduit. Preferably, these side regions are overlapped and secured by rivets at spaced intervals along the conduit.

The next step is to form a region of the conduit which is intermediate the ends of the conduit into an oval-to-oval elbow. This procedure is preferably carried out by positioning the conduit over an oval shaped die in a machine designed to transversely crimp the conduit at spaced intervals to form a relatively short radius of curvature bend. In forming the elbow bend, the riveted seam of the connector is located along the outside surface of the elbow bend, which surface is subject to minimal distortion during the formation of the bend.

Once the elbow bend has been formed, sheet regions intermediate the region of the bend and one end of the conduit are deformed to provide an oval to round transition. Where the finished connector is to connect an oval pipe to a round pipe of smaller perimeter than the oval, the transition region is notched along opposite sides to provide a transition to the smaller perimeter of the round pipe. The notched regions are then fitted into overlapping relationship and secured by rivets. Where the finished connector is to connect oval and round pipes of substantially the same perimeter, the transition region need not be notched but is merely deformed to provide the oval-to-round transition.

The final step is to secure a round collar to the round end of the transition region. This procedure is preferably carried out by positioning the collar and the round end of the transition into the dies of a machine designed to form a double shoulder lock connection therebetween. The resulting connector can have either the oval end or the round collar end crimped, as desired to fit internally of adjoining oval or round duct sections.

As will be apparent from the foregoing discussion, it is a general object of the present invention to provide a novel and improved elbow connector and methods of forming it.

Other objects and a fuller understanding of the invention may be had by referring to the following description and claims taken in conjunction with the accompanying drawings.

BRIEF DESCRIPTION OF THE DRAWINGS

FIGS. 1, 2, 3, 5 and 7 are perspective views illustrating the procedure of forming a sheet metal conduit as shown in FIG. 1 into a round-to-oval elbow connector as shown in FIG. 7;

FIG. 8 is an enlarged cross-sectional view of a portion of the elbow connector as seen from the plane indicated by the line 8—8 in FIG. 7;

FIG. 9 is a perspective view of a round-to-round elbow connector formed in accordance with the present invention; and, FIG. 10 is a perspective view of another round-to-oval elbow connector embodiment formed in accordance with the present invention.

DESCRIPTION OF THE PREFERRED EMBODIMENT

The method of forming elbow connectors in accordance with the present invention is illustrated in FIGS. 1–8. The type of connector being formed in this example is a right angle elbow connector for joining oval and round sheet metal pipes of substantially identical cross-sectional areas.

The term "oval" is intended to define a cross-sectional configuration formed by two generally flat parallel side walls joined by half round end walls having a radius of curvature equal to half the distance between the side walls. This cross section corresponds to that of sheet metal pipe commonly known as "oval pipe."

Figure 1:
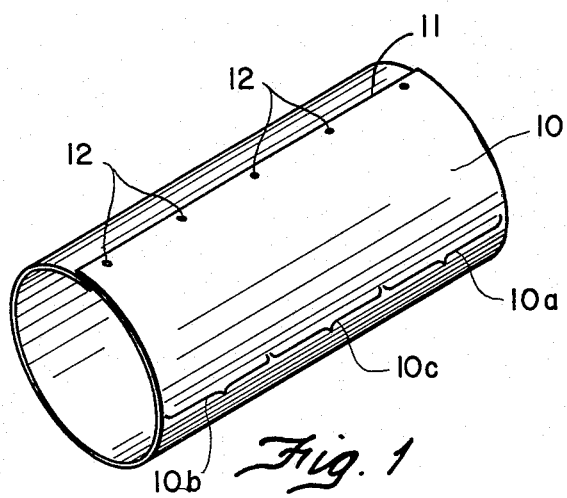

Referring to FIG. 1, the first step is to form a tubular conduit 10 having a perimeter which corresponds to that of the larger perimeter pipe with which the elbow connector is to mate. A substantially rectangular piece of sheet metal, typically of about 30 gauge thickness, is rolled in a conventional manner to form the conduit 10. Opposite sides of the sheet are overlapped to form a seam 11. Rivets 12 are used to secure the seam 11 at spaced intervals along its length.

In describing the subsequent steps of forming an elbow connector, the conduit 10 is best envisioned as comprising three distinct regions 10a, 10b, 10c, respectively. The regions 10a, 10b will be referred to as end regions. The region 10c will be called the intermediate region as it extends between the end regions 10a, 10b.

Figure 2:
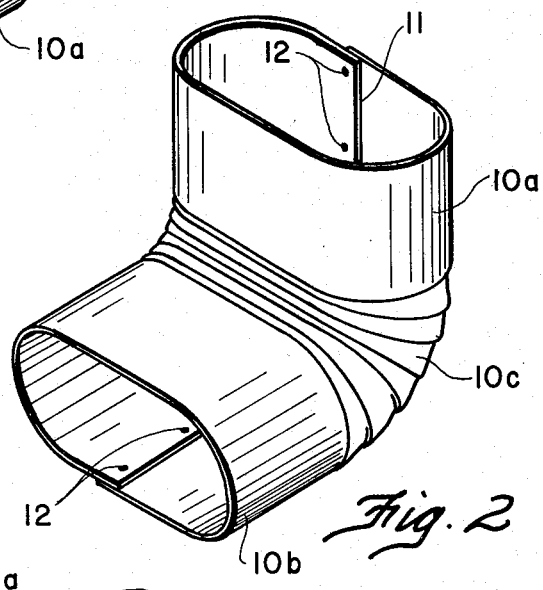
Figure 3:
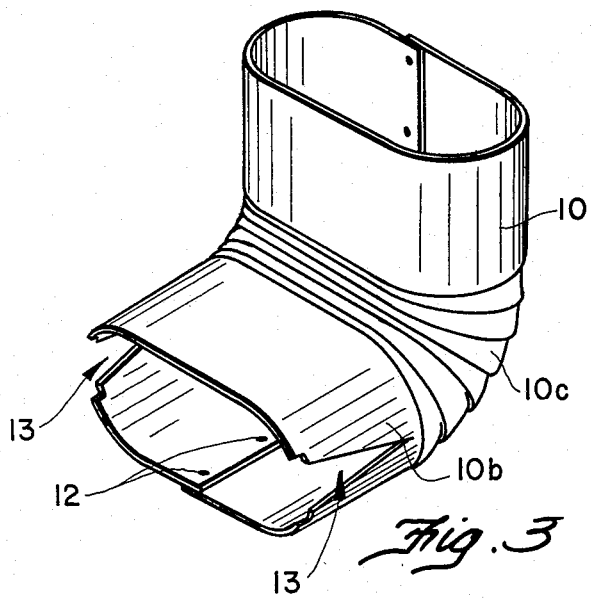
Figure 4:
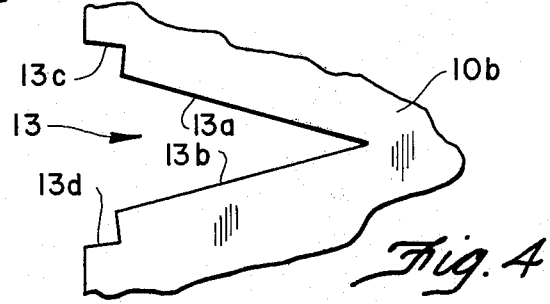
FIG. 4 is an enlarged side elevational view of a portion of the elbow connector at the stage of formation shown in FIG. 3.

Referring to FIG. 2, the second step in forming an elbow connector is to shape the intermediate region 10c to an oval cross section and to crimp the intermediate region at spaced intervals along the side opposite the seam 11, to form a short radius of curvature bend. The preferred procedure for carrying out this step is to position the conduit 10 over an oval die in a machine designed to crimp the conduit to form a short radius of curvature bend. Such a machine is sold under the trademark WELTY-WAY COPILBO, Model CE-SO6R, by Welty Way Products, Inc., Cedar Rapids, Iowa.

In forming the elbow bend, the riveted seam 11 is disposed along the outside surface of the elbow bend. This minimizes the distortion to which the seam 11 is subjected during formation of the elbow bend.

The third step is to conform the end regions 10a, 10b to the cross sectional configurations and perimeters of the pipes with which the elbow connector is to mate. The end region 10a is already of oval cross section and has a perimeter which corresponds to the oval pipe with which it will mate. The end region 10b, however, has a perimeter and a cross section which do not conform to the round pipe with which it is to mate.

The procedure of conforming the end region 10b to a round cross section of lesser perimeter is illustrated in FIGS. 3–6. A pair of notches 13 are cut in opposite sides of the conduit end region 10b. The notches 13 are essentially V-shaped, as defined by edges 13a, 13b. Right angle reliefs 13c, 13d are formed in the region of the juncture of the edges 13a, 13b and the end of the conduit 10.

Figure 6:
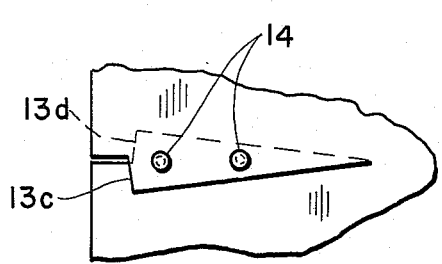
FIG. 6 is an enlarged side elevational view of a portion of the elbow connector at the stage of formation shown in FIG. 5.
Figure 5:
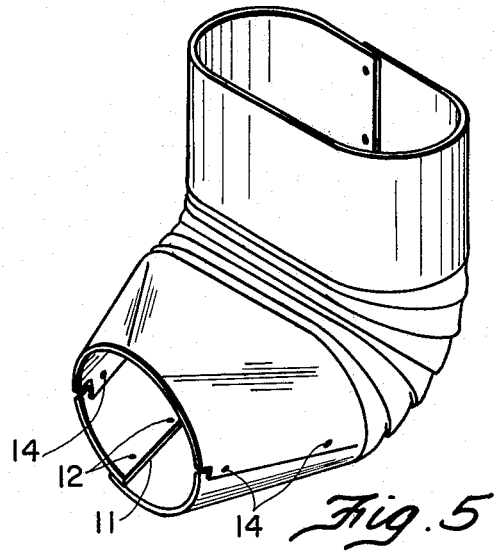

The notches 13 serve to remove excess material from the perimeter of the conduit end region 10. Referring to FIG. 6, once the notches 13 are formed, the end region 10b is deformed to bring wall portions along the edges 13a, 13b into overlapping relationship, and conforming the end of the region 10b to a round cross section with a perimeter which corresponds to the round pipe with which the connector is to mate. Rivets 14 are used to secure the overlapping wall portions along the edges 13a, 13b.

The reliefs 13c, 13d cooperate to eliminate a double thickness of material adjacent the round end of the conduit 10. This feature facilitates the formation of a juncture between the round end and a collar 15, as shown in FIG. 7.

Referring to FIG. 7, a round collar 15 is secured to the round end of the conduit 10 to provide a region of constant diameter which will mate with a round pipe of like diameter. The collar is formed from a band of sheet metal having overlapping ends secured by rivets 16. The preferred procedure for installing the collar 15 onto the round end of the conduit 10 is to insert both the collar 15 and the round end of the conduit 10 into a machine which will form a double shoulder lock connection therebetween, as shown in FIG. 8. Such a machine is sold under the trademark WELTY-WAY CO-LATCH, Models A, B, C and D, by Welty Way Products, Inc., supra.

Lastly, either the collar 15 or the end region 10a, or both are crimped axially as required to permit them to fit internally of a mating pipe. In the example of FIG. 7, the end region 10a is crimped at 17 to fit internally of a mating oval pipe. The collar 15 is not crimped and accordingly is adapted to internally receive a mating round pipe.

The connector embodiment in the described example is typically used to connect an 8 inch oval conduit to a 7 inch round conduit, or a 6 inch oval to a 5 inch round, or a 5 inch oval to a 4 inch round, etc.

A variety of elbow connector embodiments can be formed in similar fashion to the described example. Referring to FIG. 9, a round to round connector 10' can be formed by conforming both end regions 10a', 10b', to round cross sections of required perimeter. The resulting elbow can connect round pipes of equal or dissimilar sizes.

Referring to FIG. 10, a round to oval connector 10' for connecting round and oval pipes of identical perimeters is formed by eliminating the step of notching and tapering the end region 10b'. The end region 10b' is simple conformed to a round shape and a collar 15' secured as described above.

Each of the elbow connector embodiments incorporates the following basic features of the invention. First, the bulk of the connector is formed from a single piece of sheet metal conduit having a perimeter that corresponds to the perimeter of the largest pipe with which it is to mate. Second, the intermediate region of the connector is crimped at spaced intervals to provide a short radius of curvature bend. Third, the cross section of the connector in the intermediate region is oval. Fourth, the end regions of the connector form a transition as required from the oval cross section of the intermediate region to the respective cross-sectional configurations and perimeters of the pipes with which the connector is to mate.

Although the invention has been described in its preferred from with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed.

What is claimed is:

1. A sheet metal elbow connector having a substantially constant cross-sectional area along its length, comprising:

a. a single substantially rectangular sheet of metal formed into a tubular conduit open at first and second opposite ends and having a longitudinally extending seam where side portions of said sheet are overlapped and secured together, said conduit having first and second end regions near said first and second ends and an intermediate region between said end regions;

b. said conduit being formed into an elbow by forming a series of closely spaced perimetrically extending crimps in said intermediate region to define an elbow bend having a short inner radius of curvature with said seam extending along the outer radius of curvature, said elbow bend having a generally oval cross-section with a substantially constant cross-sectional area along its length;

c. said first end region defining a substantially smooth-walled tube having substantially said constant cross-sectional area along its length as it extends from said intermediate region to said first end;

d. said second end region having a pair of substantially V-shaped notches formed in opposite sides at locations disposed substantially 90° around the periphery of said end region from the location of said seam, and having portions which define said notches positioned in overlapping relationship and secured together to form a pair of side seams which cause the perimeter of said second end region to diminish as said second end region extends away from said intermediate region while the cross-sectional area of said second end region remains substantially equal to said constant cross-sectional area as said second end region extends along its length from said intermediate region to said second end, said second end having a substantially round configuration with a cross-sectional area substantially equal to said constant cross-sectional area, whereby said second end region forms a substantially smooth-walled tubular transition between said substantially oval cross-section of said intermediate region and said substantially round configuration of said second end; and, e. a sheet metal band secured to said second end region near said second end, said band defining a round tube which extends away from said second end region and which has a cross-sectional area substantially equal to said constant cross-sectional area to enable connection of said second end region to a round sheet metal conduit having a cross-section area substantially equal to said constant cross-sectional area.

2. The sheet metal elbow connector of claim 1 wherein said portions which define said V-shaped notches and which are positioned in overlapping relationship are secured together by rivets extending through aligned apertures formed in overlapping ones of said portions.

3. The sheet metal elbow connector of claim 1 wherein said sheet metal band is secured to said second end region by crimping said band and said second end region to form mating perimetrically extending formations.

4. The sheet metal elbow connector of claim 1 wherein said V-shaped notches are relieved near said second end such that when said portions are positioned in overlapping relationship, no overlap is provided for a short distance along said notches immediately adjacent said second end, whereby said second end is defined along its perimeter by a single thickness of sheet metal, and, said sheet metal band is secured to said single thickness of sheet metal.

5. A round to oval elbow connector formed from sheet metal and having a substantially constant cross-sectional area along its length, comprising:
a. a single substantially rectangular sheet of metal formed into a tubular conduit open at first and second opposite ends and having a longitudinally extending seam where side portions of said sheet are overlapped and secured together, said conduit having first and second end regions near said first and second ends and an intermediate region between said end regions;
b. said conduit being formed into an elbow by forming a series of closely spaced perimetrically extending crimps in said intermediate region to define an elbow bend having a short inner radius of curvature with said seam extending along the outer radius of curvature, said elbow bend having a generally oval cross-section with a substantially constant cross-sectional area along its length;
c. said first end region defining a tube of substantially oval cross-section and having substantially said constant cross-sectional area along its length as it extends from said intermediate region to said first end, whereby said second end region forms a substantially smooth-walled tube connectable to a conduit of oval cross-section having a cross-sectional area substantially equal to said constant cross-sectional area;
d. said second end region having a pair of substantially V-shaped notches formed in opposite sides at locations disposed substantially 90° around the periphery of said end region from the location of said seam, and having portions which define said notches positioned in overlapping relationship and secured together to form a pair of side seams which cause the perimeter of said second end region to diminish as said second end region extends away from said intermediate region while the cross-sectional area of said second end region remains substantially equal to said constant cross-sectional area as said second end region extends along its length from said intermediate region to said second end, said second end having a substantially round configuration with a cross-sectional area substantially equal to said constant cross-sectional area, whereby said second end region forms a substantially smooth-walled tubular transition between said substantially oval cross-section of said intermediate region and said substantially round configuration of said second end; and,
e. a sheet metal band secured to said second end region near said second end, said band defining a round tube which extends away from said second end region and which has a cross-sectional area substantially equal to said constant cross-sectional area to enable connection of said second end region to a round sheet metal conduit having a cross-sectional area substantially equal to said constant cross-sectional area.

6. The sheet metal elbow connector of claim 5 wherein said portions which define said V-shaped notches and which are positioned in overlapping relationship are secured together by rivets extending through aligned apertures formed in overlapping ones of said portions.

7. The sheet metal elbow connector of claim 5 wherein said sheet metal band is secured to said second end region by crimping said band and said second end region to form mating perimetrically extending formations.

8. The sheet metal elbow connector of claim 5 wherein said V-shaped notches are relieved near said second end such that when said portions are positioned in overlapping relationship, no overlap is provided for a short distance along said notches immediately adjacent said second end, whereby said second end is defined along its perimeter by a single thickness of sheet metal, and, said sheet metal band is secured to said single thickness of sheet metal.

* * * * *